(12) United States Patent
Michnik et al.

(10) Patent No.: US 8,453,300 B1
(45) Date of Patent: Jun. 4, 2013

(54) ON DEMAND HANDLING APPARATUS

(76) Inventors: Alisa Michnik, Cherry Hill, NJ (US);
Yefim Michnik, Cherry Hill, NJ (US)

( * ) Notice: Subject to any disclaimer, the term of this patent is extended or adjusted under 35 U.S.C. 154(b) by 74 days.

(21) Appl. No.: 13/187,085

(22) Filed: Jul. 20, 2011

(51) Int. Cl.
  *B25G 3/32* (2006.01)
(52) U.S. Cl.
  USPC ................ 16/422; 16/425; 16/430
(58) Field of Classification Search
  USPC .............. 16/422, 445; 294/99.2, 16, 13, 106, 294/902, 31.2; 269/6, 95, 81, 96; 29/270, 29/268; 220/759; 248/229.15, 228.6, 229.21; 24/17 A, 19, 20 CW, 278, 279; 81/177.1, 81/177.8, 489; 15/145, 150, 151; 403/90, 403/93, 94–96
  See application file for complete search history.

(56) References Cited

U.S. PATENT DOCUMENTS

| | | | | |
|---|---|---|---|---|
| 892,105 A * | 6/1908 | White | ...................... | 248/60 |
| 973,319 A * | 10/1910 | Thunen et al. | ............. | 248/230.5 |
| 993,757 A * | 5/1911 | Chrysler | ....................... | 403/141 |
| 2,790,669 A * | 4/1957 | Crawford | ..................... | 294/31.2 |
| 2,942,910 A * | 6/1960 | Bramming | ................... | 294/31.2 |
| 3,050,326 A * | 8/1962 | Miller | .............................. | 294/15 |
| 3,981,044 A * | 9/1976 | Luebke et al. | ................ | 220/759 |
| 4,620,813 A * | 11/1986 | Lacher | ............................ | 403/93 |
| 4,842,158 A * | 6/1989 | Reyes, Jr. | ...................... | 222/470 |
| 5,042,114 A * | 8/1991 | Parrish | ....................... | 24/16 PB |
| 6,241,415 B1 | 6/2001 | Stark | | |
| 7,165,489 B1 * | 1/2007 | Fernandez et al. | ............. | 99/422 |
| 2005/0028329 A1 * | 2/2005 | Castellanos | ................ | 24/274 R |

FOREIGN PATENT DOCUMENTS

GB     139789 A     12/1920

* cited by examiner

*Primary Examiner* — Chuck Y. Mah

(57) ABSTRACT

A handling apparatus comprising an object, at least one band, and at least one detachable handle. A desired number of the handles can be put on any of the bands, and positions of the handles may be adjusted within the bands. The handles put on each of the bands are secured to the object simultaneously and without user intervention when user secures the band to the object. The handles may comprise detachable gripping members which can be oriented differently about the object after the handles are secured to the objects by the bands. The handles and the bands may be reused with differently configured objects. As the result, the device is economic, ergonomic, and easy to use.

3 Claims, 3 Drawing Sheets

ON DEMAND HANDLING APPARATUS

BACKGROUND OF THE INVENTION

1. Field of the Invention

This invention relates to a field of cookware or any other field, where specifically, a desired number of detachable handles can be attached to a man-made object differently depending on a particular task.

2. Background of the Invention

Detachable handles for cookware such as pots and pans add a great deal of convenience by saving space in storage, refrigerator, dishwasher, on the stove top, and in the oven. This is essential when storage and kitchen space is limited.

G.B. Pat. No. 139,789 issued on Dec. 23, 1920 to Johan Theodore Johansson discloses an implement for clasping and carrying cooking vessels or the like using a detachable handle.

U.S. Pat. No. 6,241,415 issued on Jun. 5, 2001 to Marvin B. Stark discloses a device for holding a container by a detachable handle.

However, the prior art handling apparatuses do not permit changing number of handles and relative positions of handles about each other according to a task at hand.

Consequently, there is a need for a handling apparatus permitting users to decide how many handles they want to be attached for a particular task and where, while keeping the deployment time down. This invention achieves this while overcoming the disadvantages of the prior art devices. From now on, a cookware application, such as a pot or a pan with handle(s), will be used for demonstrating the invention.

OBJECTS OF THE INVENTION

Accordingly, several objects and advantages of the present invention are:

To provide a convenient device permitting a user to vary number of handles depending on a particular task.

To provide an even more convenient device permitting a user to rearrange handles around a pot or a pan depending on a particular task.

To provide an ergonomic device permitting a user to adjust an angular position of each handle depending on a particular task.

To provide a still more convenient device permitting a user to attach a desired number of handles in desired spots such that, for instance, a large and heavy pot can be handled by as many people as necessary.

To provide a space saving device permitting a user to remove all handles for storage.

To provide an economic device since pots and pans can be manufactured without handles.

To provide an even more economic device by providing handles which can be used with pots and pans of different sizes and, therefore, only a small number of handles is necessary, depending on a number of burners, rather than on a total number of pots and pans.

To provide a low maintenance and hygienic device comprising no exposed hidden spots capable of catching food particles when cooking.

To provide a device which is easy to use by providing detachable handles that can be attached to a pot or a pan at the same time: one by each hand.

To provide a safe device which does not require force when attaching a handle to an object, for instance, reducing the risk of spilling the contents of a pot.

To provide a device which reduces risk of getting burned by encouraging the attachment of handles only for a short period of time when removing, for instance, a hot pot from an oven.

To provide a sufficient device which does not require additional protective means, for instance, cooking mitts for hot applications.

To provide a device with security by providing hard to substitute detachable handles where, for instance, heavy or bulky objects cannot be handled easily, if at all, without such specialized handles.

Further objects and advantages of this invention will become apparent from a consideration of the drawings and ensuing description.

SUMMARY OF THE INVENTION

The present invention may be generally described as a handling apparatus comprising a man-made rigid object, at least one detachable band, and at least one detachable handle; each of the handles can be put on one of the bands before the band is secured to the object; when a user secures any of the bands around a predetermined exterior region of the object, for instance, by tightening the band to a predetermined torque, all of the handles put on the band get secured to the object too by force of friction simultaneously. A number of the handles on, and a position of each handle within, each of the bands are chosen by a user depending on a particular task. More than one band may be attached, for instance, when the handled object is bulky or heavy and requires more than one person for handling. Any of the handles may comprise a detachable gripping member for achieving a plurality of three-dimensional angular orientations about the handled object: see, for instance, the applicants' U.S. Pat. No. 7,793,389. In addition, the bands may be adjustable, and handles may be designed, for reusing around different exterior regions of the object making such handling apparatus more affordable since only a few bands and handles are required regardless of a number of the objects to handle.

The features briefly described in this summary as well as other features and advantages of this invention will become apparent to those skilled in the art upon review of the following drawings, the detailed description, and the appended claims.

DETAILED DESCRIPTION OF THE INVENTION

Figure 1:
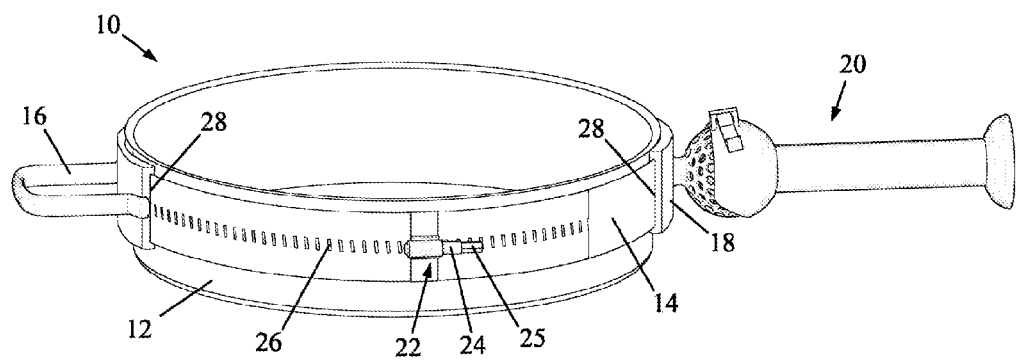
FIG. 1 is a perspective view of a handling apparatus comprising a cooking pan, an adjustable band secured to the pan, and two handles secured by the band where one of the handles comprises a detachable gripping member.
Figure 2:
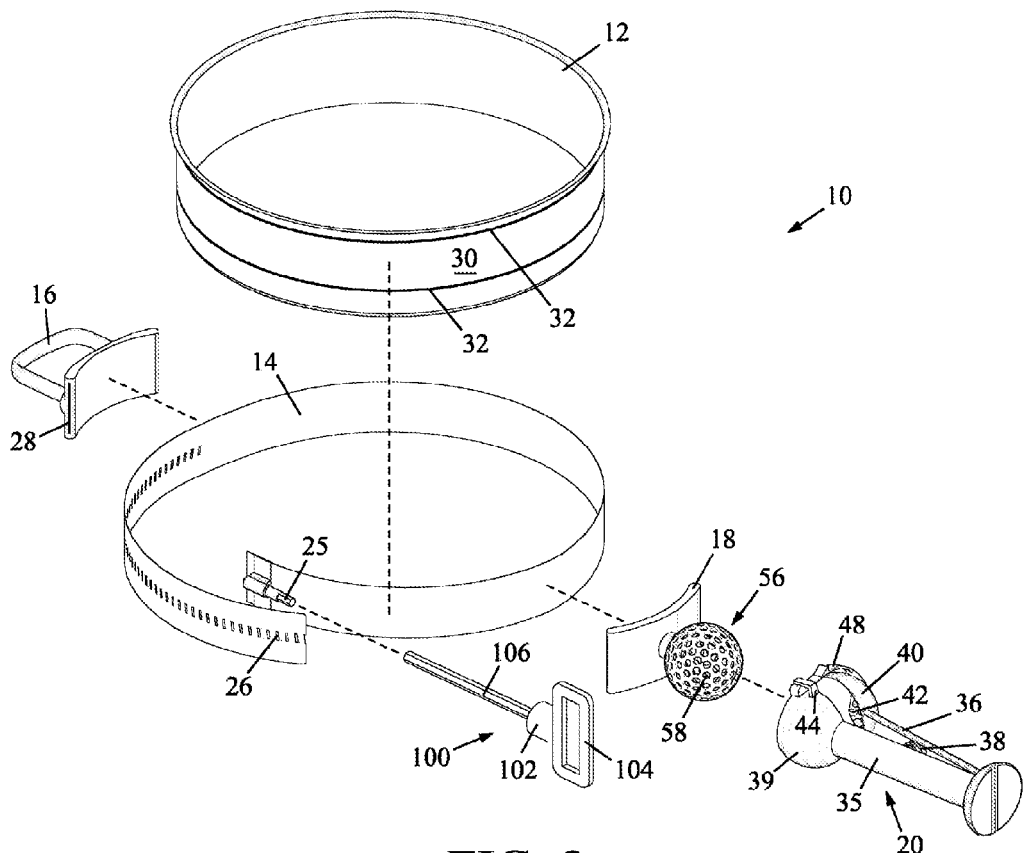
FIG. 2 is an exploded view of the handling apparatus depicted in FIG. 1 shown, in addition, with a torque device.
Figure 3:
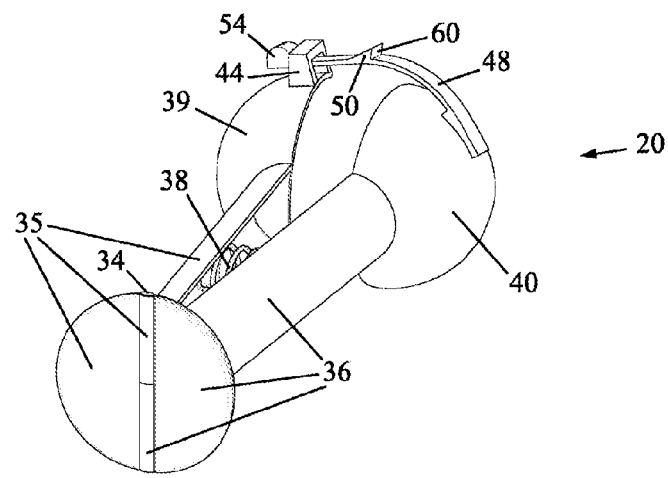
FIG. 3 is a perspective view of a detachable gripping member detached.

FIGS. 1-5 depict a handling apparatus 10 comprising a cooking pan 12, an adjustable band 14 with two detachable handles 16 and 20 put thereon, and a torque device 100 (see FIG. 2). Cooking pan 12 comprises a marked area 30 between two lines 32 encircling cooking pan 12 (see FIG. 2). Marked area 30 is a means for identifying an exterior region of cooking pan 12 by a user for securing band 14 there around. Band 14 is identical to known in the art stainless steel hose clamps with a variable length adjustment by a screw; accordingly band 14 comprises a securing means implemented as a screw assembly 22 comprising a screw 24 having a hexagonal head 25 and slots 26 complementary to the thread of screw 24. Each of handles 16 and 20 comprises a throughout slot 28 (best shown in FIG. 2) permitting a user to slide each of the handles onto, remove it off, and readjust a position of it within, band 14 when the band is unsecured from pan 12. Band 14 is for securing its handles automatically and simultaneously due to force of friction of a predetermined value when looped around marked area 30 and tightened up to a predetermined torque applied to screw 24 by torque device 100.

Torque device 100 (see FIG. 2) comprises a torque member 102, a handle 104 connected from one side of torque member 102, and a hollow hexagonal key 106 connected from the other side of torque member 102. Hexagonal key 106 is hollow for engaging with hexagonal head 25 when put on by a user. Torque member 102 permits transfer of rotational movement from handle 104 to key 106 until a torque limit equal to the aforementioned predetermined torque is reached. A construction of torque member 102 is not demonstrated since torque limiting devices are well known in the art: screwdrivers, for instance.

Handle 16 is conventional. Handle 20 (see also the applicants' U.S. Pat. No. 7,793,389) comprises a ball attachment 18, a shaft 34 (best seen in FIG. 3), two gripping members 35 and 36 pivotally secured about each other on shaft 34 by one end each and urged from each other by a spring 38. At the other ends, gripping members 35 and 36 comprise, respectively, spherical segments 39 and 40, each comprising a plurality of circular teeth 42 (see FIG. 2) arranged in a polka dot pattern. Spherical segment 39 comprises a frame 44. Spherical segment 40 comprises a longitudinal spring 48 secured by one end thereto wherein the other end is urged there from and disposed inside of frame 44 in a compressed state. Spring 48 comprises a bulb 54 and a locking angular member 50 comprising a wall 60. Ball attachment 18 comprises a hollow ball 56 having a plurality of circular holes 58 arranged in a polka dot pattern complementary to the polka dot pattern of teeth 42. In use, gripping members 35 and 36 can be engaged with ball attachment 18 in a plurality of positions around ball 56 when user, after orienting spherical segments 39 and 40 around ball 56, squeezes gripping members 35 and 36 engaging teeth 42 with holes 58, compressing spring 38, and causing spring 48 to go further inside of frame 44 until locking angular member 50 locks to frame 44 by its wall 60 due to the decompression force of spring 48 keeping wall 60 against frame 44 and, as the result, fixating gripping members 35 and 36 around ball 56 in a chosen by user position: for instance, FIG. 1 shows horizontal orientation of gripping members 35 and 36 attached to pan 12. Gripping members 35 and 36 can be detached from ball attachment 18 when a user presses onto bulb 54 toward spherical segment 39 until wall 60 gets disengaged from frame 44, at which point the decompression force of spring 38 urges gripping members 35 and 36 apart where bulb 54 limits the separation distance by engaging with frame 44, but such that user is able to detach gripping member 20 from pan 12.

Figure 4:
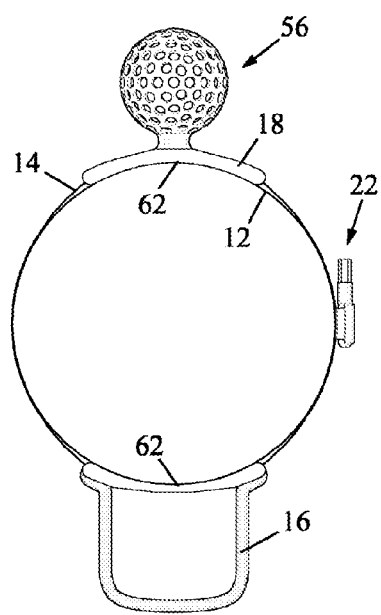
FIG. 4 is a top view of the handling apparatus depicted in FIG. 1 demonstrating a pan with a minimum radius permitted.
Figure 5:
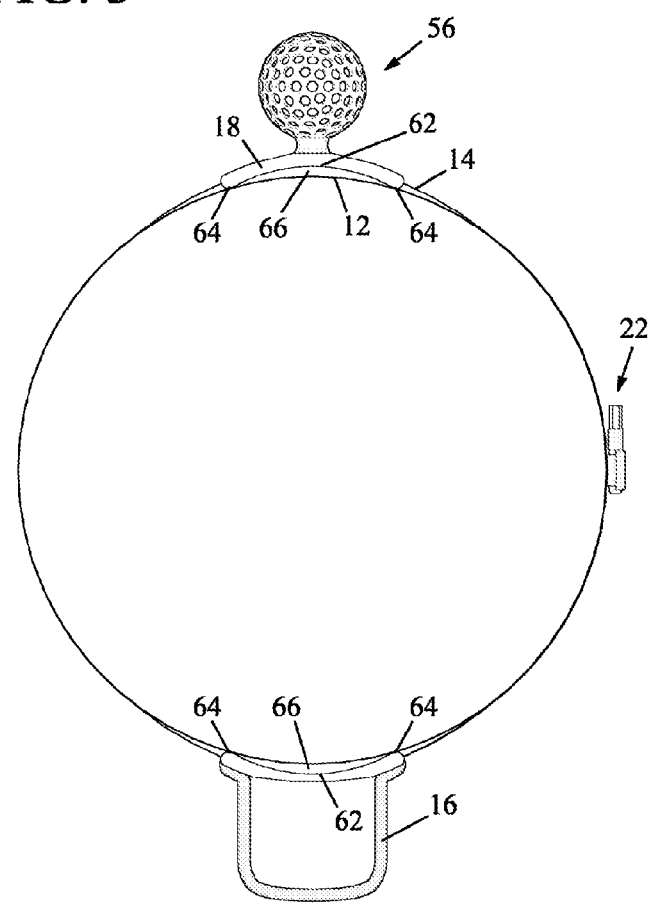
FIG. 5 is a top view of the handling apparatus depicted in FIG. 1 demonstrating a pan with a radius larger than the minimum radius demonstrated by FIG. 4.

The length of band 14 is predetermined for surrounding exterior regions of different sizes within a predetermined range. In addition, the handles may be preconfigured for using with cookware having exterior regions of different sizes too: a portion of each of the handles contacting pan 12 is shaped as an arc 62 (best seen in FIGS. 4 and 5). FIG. 4 demonstrates pan 12 with a minimum permitted radius equal to the radius of arc 62 where full contact along arc 62 is accomplished. FIG. 5 demonstrates that any pan 12 with a radius larger than the radius of arc 62 can be handled by the handles due to only two regions 64 contacting pan 12; for clarity, a gap 66 between arc 62 and pan 12 is referenced in FIG. 5.

Figure 6:
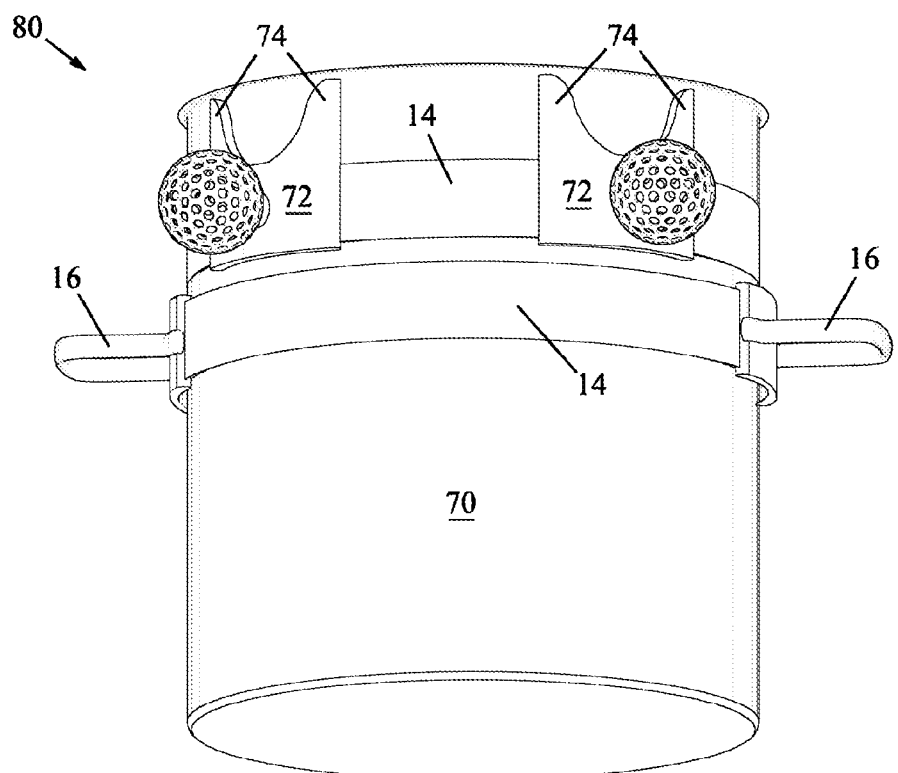
FIG. 6 is a perspective view of a handling apparatus comprising a cooking pot, a lower band securing two handles with not detachable gripping members, and an upper band securing two handles with detachable gripping members.
Figure 7:
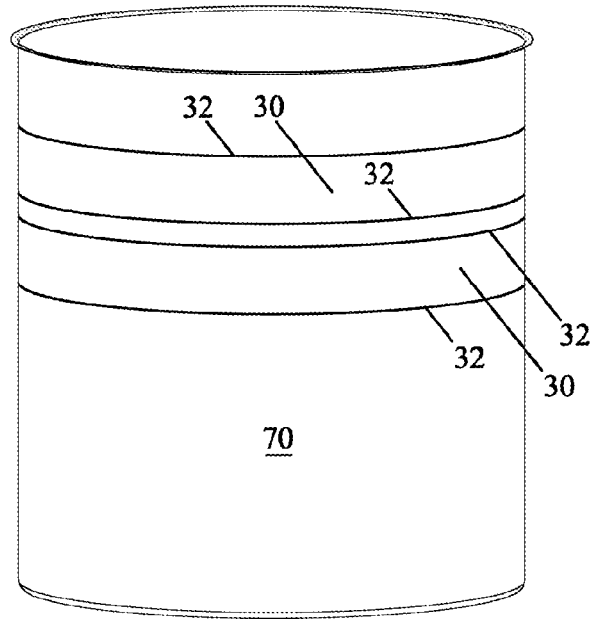
FIG. 7 is a perspective view of the cooking pot depicted in FIG. 6 comprising two marked areas.

For demonstrating that different objects can be handled, FIGS. 6 and 7 demonstrate a handling apparatus 80 which is identical to handling apparatus 10 except that instead of pan 12, a pot 70 is an object to handle, and ball attachments 72 differ from ball attachments 18 of embodiment 10 by wings 74 for increasing a mechanical advantage when handling pot 70 (of course, ball attachments 18 can be used with pot 70 too instead of, and in addition to, ball attachments 72). For demonstrating versatility of the invention, pot 70 also comprises two marked areas 30 (see FIG. 7) with two bands 14 attached wherein two handles 16 are secured on the lower band 14 and two ball attachments 72 are secured on the upper band. Although cooking applications having circular pot and pan were demonstrated, objects having non-circular shapes can be handled as well, for instance by integrating chain portions (not shown) into the bands for adapting to virtually any shape of the marked areas. Although marked areas 30 are optional, they are highly advisable for eliminating guesswork and, therefore, for reducing a probability of human error; in addition, marked areas 30 may be distinguished by other means: for instance, by colors or by different finishes.

Those who are skilled in the art will readily perceive how to modify the invention. Therefore, the appended claims are to be construed to cover all equivalent structures which fall within the scope and spirit of the invention.

We claim:
1. A handling apparatus comprising:
 a) a man-made object to be handled repeatedly by at least one user, said man-made object comprises a rigid body having at least one exterior region predetermined such that said rigid body is surrounded entirely by each of said at least one exterior region;
 b) at least one band, each of said at least one band comprises a securing means for securing a position of the band about said man-made object when the band is temporarily positioned around said man-made object over any of said at least one exterior region preconfigured for accommodating the band;
 c) at least one handle for facilitating handling of said man-made object by said at least one user, each of said at least one handle is preconfigured for being put on, removed off, or repositioned within at least one predetermined portion of, any of said at least one band preconfigured for accommodating the handle when the band is not secured to said man-made object by said securing means, wherein the handle is also preconfigured such that a position of the handle put on the band is secured about the band and said man-made object without user intervention when the band is secured to said man-made object by said securing means, thereby all of said at least one handle put on any one of said at least band are secured to, or unsecured from, the band and said man-made object simultaneously when, respectively, the band is secured to, or unsecured from, said man-made object by said securing means.

2. The handling apparatus of claim 1, wherein each of a predetermined number of said at least one handle is also preconfigured for being used with any of a plurality of the bands configured differently.

3. The handling apparatus of claim 1, wherein each of a predetermined number of said at least one band is also preconfigured for being used with any of a plurality of the exterior regions configured differently.

\* \* \* \* \*